United States Patent
De Broqueville

(10) Patent No.: US 9,504,977 B2
(45) Date of Patent: Nov. 29, 2016

(54) ROTARY DISC DEVICE IN A ROTARY FLUIDIZED BED AND METHOD USING SAID DEVICE

(71) Applicant: Axel De Broqueville, Grez-Doiceau (BE)

(72) Inventor: Axel De Broqueville, Grez-Doiceau (BE)

( * ) Notice: Subject to any disclaimer, the term of this patent is extended or adjusted under 35 U.S.C. 154(b) by 59 days.

(21) Appl. No.: 14/397,509

(22) PCT Filed: Apr. 4, 2013

(86) PCT No.: PCT/BE2013/000016
§ 371 (c)(1),
(2) Date: Oct. 28, 2014

(87) PCT Pub. No.: WO2013/170321
PCT Pub. Date: Nov. 21, 2013

(65) Prior Publication Data
US 2015/0123039 A1  May 7, 2015

(30) Foreign Application Priority Data

May 15, 2012  (BE) .................................. 2012/0322

(51) Int. Cl.
*C10G 9/32* (2006.01)
*B01J 8/00* (2006.01)
(Continued)

(52) U.S. Cl.
CPC ............ *B01J 8/0045* (2013.01); *B01F 5/0065* (2013.01); *B01F 5/0068* (2013.01); *B01F 7/10* (2013.01);
(Continued)

(58) Field of Classification Search
CPC ............... C10J 2300/0993; C10J 3/46; C10J 2300/0986; C10J 2300/0916; B01J 2208/00752; B01J 8/38; B01J 2208/00761; B01J 2208/00309; B01J 8/382; B01J 8/004; B01F 5/0068; B01F 7/10; B01F 5/0065; C08F 10/02; C10G 11/182; C10G 9/32
USPC ........ 366/263; 422/147, 135, 142, 145, 140, 422/306; 34/58, 594; 514/251; 264/117, 264/114, 109; 424/489
See application file for complete search history.

(56) References Cited

U.S. PATENT DOCUMENTS

| | | | | |
|---|---|---|---|---|
| 5,296,265 A | * | 3/1994 | Okuma ................... | B01J 2/006 118/303 |
| 2009/0311092 A1 | | 12/2009 | de Broqueville | |
| 2010/0197879 A1 | * | 8/2010 | De Broqueville | ....... B01J 2/006 526/348 |

FOREIGN PATENT DOCUMENTS

| | | |
|---|---|---|
| EP | 0 544 289 A2 | 6/1993 |
| EP | 2 127 738 A1 | 12/2009 |
| WO | 2008011689 A1 | 1/2008 |

OTHER PUBLICATIONS

International Search Report dated Sep. 29, 2013 in connection with PCT International Patent Application No. PCT/BE2013/00016, 3 pages.

*Primary Examiner* — Stanley Silverman
*Assistant Examiner* — Syed Iqbal
(74) *Attorney, Agent, or Firm* — Amster, Rothstein & Ebenstein LLP

(57) ABSTRACT

The invention relates to a rotary disc device (1) in a rotary fluidized bed, the outer edge of said disc rotating inside, and faster than, the fluidized bed, thereby allowing: the rotation speed of the fluidized bed to be accelerated, solid particles and/or micro-droplets to be supplied to the fluidized bed or to the free central area, and different annular areas of the fluidized bed to be separated. The invention also relates to methods for transforming solid particles or micro-droplets on contact with the fluids flowing through the rotary fluidized bed or for transforming fluids on contact with solids in suspension in the rotary fluidized bed, using said device.

18 Claims, 8 Drawing Sheets

(51) Int. Cl.
  *B01J 8/38*  (2006.01)
  *B01F 5/00*  (2006.01)
  *B01F 7/10*  (2006.01)
  *C08F 10/02*  (2006.01)
  *C10G 11/18*  (2006.01)
  *C10J 3/46*  (2006.01)

(52) U.S. Cl.
  CPC  *B01J 8/38* (2013.01); *B01J 8/382* (2013.01); *C08F 10/02* (2013.01); *C10G 9/32* (2013.01); *C10G 11/182* (2013.01); *C10J 3/46* (2013.01); *B01J 2208/00309* (2013.01); *B01J 2208/00752* (2013.01); *B01J 2208/00761* (2013.01); *C10J 2300/0916* (2013.01); *C10J 2300/0986* (2013.01); *C10J 2300/0993* (2013.01)

ROTARY DISC DEVICE IN A ROTARY FLUIDIZED BED AND METHOD USING SAID DEVICE

CROSS-REFERENCE TO RELATED APPLICATIONS

This application is a U.S. national stage entry under 35 U.S.C. §371 of PCT International Patent Application No. PCT/BE2013/00016, filed Apr. 4, 2013, which claims priority to Belgium Patent Application No. 2012/0322, filed May 15, 2012, the contents of all of which are incorporated herein by reference in their entirety.

TECHNICAL FIELD OF THE INVENTION

The present invention relates to devices for obtaining rotary fluidized beds within a fixed circular chamber, and to processes for converting fluids and/or solids using these devices.

TECHNOLOGICAL BACKGROUND OF THE INVENTION

The obtaining of rotary fluidized beds in a fixed circular chamber, making it possible, by virtue of centrifugal force, to pass a dense bed of fluidized solid particles through a very large quantity of fluids with the aid of the injection of said fluids, at high speed, at a tangent to the fixed circular wall delimiting the circular chamber, is known. See the international patent application WO-A-2005/099887 in the name of the same inventor.

The results of experiments and simulations show that the solid particles mix rapidly, as in a stirred reactor. Transfers of heat between the solid particles of the rotary fluidized bed and fluids which pass through the latter are extremely rapid. This makes it possible to control the temperature of the fluidized bed with high precision, even if the interactions between the fluids and the solid particles generate highly exothermic and/or endothermic chemical or physical reactions.

Rotary fluidized beds have a relatively small thickness (radial dimension) and the flow rate of the fluids which pass through the rotary fluidized bed is very high. This allows a very short contact time, of around a few milliseconds, between the fluids and the solid particles in the rotary fluidized bed. The exploitation of this very short contact time is generally encouraged by the use of very fine solid particles, of the order of tens of micrometers, which generally form rotary fluidized beds which are unstable and inhomogeneous since the energy losses due to the turbulence and friction against the lateral walls increase rapidly when the size of the particles decreases. In some cases, it may be necessary to cool the fluids as soon as they have passed through the rotary fluidized bed, this tending to increase the instabilities of the rotary fluidized bed. The feeding of the solid particles into the interior of the circular chamber also generates instabilities.

The use of a rotary chimney as described in the patent application PCT/EP2007/053941 filed by Total Petrochemicals Research Feluy on Apr. 23, 2007 in the name of the same inventor makes it possible to improve the stability and the concentration of the rotary fluidized bed. It also makes it possible to cool the fluids as soon as they pass into the rotary chimney. However, the production and use of a rotary chimney are relatively complex.

The present invention makes it possible to obtain similar results while being easier to produce. It also makes it possible to improve the devices for feeding solids and/or liquids, to ensure good separation between different annular zones of the rotary fluidized bed and fluids which have passed through the rotary fluidized bed. It also makes it possible to control the circulation of the solids between these different annular zones.

SUMMARY OF THE INVENTION

The present invention relates to a device for obtaining a rotary fluidized bed within a circular chamber delimited by a circular wall (15) and fixed lateral walls (13) and (14), comprising:
- a device (3) for injecting gaseous and/or liquid fluids through numerous injection openings (16) distributed along said circular wall in directions mainly at a tangent to said circular wall;
- a device (6) for centrally discharging fluids which have passed through the rotary fluidized bed through one or more central outlet openings (21.1) and (21.2) disposed around or in the vicinity of the central axis (11) of said circular chamber;
- a device for feeding solid particles into the circular chamber;
- a device for discharging solid particles from the circular chamber, comprising at least one outlet opening (30) located at a distance (31) from said circular wall that corresponds to the desired thickness of the rotary fluidized bed;

characterized in that it comprises:
- at least one rotary disk (1) the rotation axis of which is along or in the vicinity of the central axis (11) of the circular chamber and the outer rim of which is at a distance (41) from said circular wall that is less than the desired thickness (31) of the rotary fluidized bed when the device is in operation;
- a device (12) for rotating said rotary disk in the same direction as and at a greater speed than said rotary fluidized bed.

This device makes it possible to increase the speed of rotation of the rotary fluidized bed by virtue of the friction between the disk and the rotary fluidized bed. Since this friction is relatively low, especially if the rotary disk is smooth, the rotary disk can rotate much more quickly than the rotary fluidized bed. This makes it possible to also increase the speed of rotation of the fluids (6) which have passed through the rotary fluidized bed and which pass, while rotating, through the free central zone, containing few solid particles, and thus to encourage the formation in this free central zone of a free vortex which repels the solid particles which had been entrained by said fluids (6), which are discharged through said central outlet openings.

In order to obtain a stable and dense rotary fluidized bed, it is necessary for the centrifugal force to be significantly greater than the entrainment force of the fluids. The first force is proportional to the square of the tangential speed of rotation of the solid particles, to the cube of their diameter and to their density, and inversely proportional to the radius of the circular chamber. The second force is proportional to the square of the radial speed of the fluids through the rotary fluidized bed, to the square of the diameter of the solid particles and to the density of the fluids.

The rotary disk can increase the speed of rotation of the rotary fluidized bed to the level necessary for obtaining a dense and stable rotary bed, by increasing, if necessary, the friction between the rotary disk and the rotary fluidized bed, for example by modifying the rim or the surface in the vicinity of the rim of the rotary disk with the aid of teeth, protuberances or fins.

In accordance with one particular embodiment of the invention, the outer rim of the rotary disk or at least a part of the surface of the rotary disk, which is in contact with the rotary fluidized bed when the device is in operation, comprises teeth or protuberances or fins which increase the friction between the rotary disk and the fluidized bed.

In accordance with this particular embodiment of the invention, said teeth, protuberances or fins and/or said part of the surface of the rotary disk are profiled so as to push the solid particles in the desired longitudinal direction when the rotary disk rotates more quickly than the rotary fluidized bed.

However, technical constraints and/or constraints of the process using this device can limit this transfer of angular moment of rotation from the disk to the rotary fluidized bed. It is thus desirable to optimize the speed of rotation of the rotary fluidized bed with the aid of the fluids which are injected into the rotary fluidized bed.

The analysis of the results of experiments makes it possible to pragmatically deduce the desired relationships between the various dimensions of the device for feeding the fluids, in order to help the rotary disk or disks obtain relatively dense, stable and homogeneous rotary fluidized beds.

In accordance with one particular embodiment of the invention, the square of the ratio between the surface area of the circular wall (15) and the sum of the surface areas of said injection openings (16) is greater than 200 times and preferably greater than 400 times the ratio between the diameter of the circular chamber, D, and the mean diameter of the solid particles, d, multiplied by the ratio between the density of the fluid, ρf, and the density of the solids, ρs.

When said injection openings for fluids are slots passing longitudinally through the circular surface, the ratio of the surface areas is equal to the ratio between the distance, di, (96) between the injection slots for the fluids and the thickness, εi, (95) of the injection slots.

In accordance with one particular embodiment of the invention, said injection openings for the fluids are slots passing longitudinally through said circular wall and the square of the ratio between the mean distance, di, (96) between said injection slots and the mean thickness, εi, (95) of said slots is greater than 200 times and preferably 400 times the ratio between the mean diameter of said circular chamber, D, and the mean diameter of said solid particles, d, multiplied by the ratio between the mean density of said fluids, ρf, and the density of said solids, ρs, i.e.:

$$(di/\epsilon i)^2 > 200 \cdot (D/d) \cdot (\rho f/\rho s)$$

and preferably $$(di/\epsilon i)^2 > 400 \cdot (D/d) \cdot (\rho f/\rho s)$$

Experiments and simulations have shown that it is desirable for the distance, di, between said slots to be small compared with the mean diameter, D, of the circular chamber, in order to obtain a stable and homogeneous rotary fluidized bed.

In accordance with one particular embodiment of the invention, the mean distance (96), di, between the injection openings for the fluids through the circular wall is less than one tenth and preferably less than one twentieth of the mean diameter, D, of said circular wall.

When the injection openings are slots, the distance, di, between the slots is equal to the mean circumference of the circular chamber divided by the number of slots. It is thus desirable for the number of slots to be greater than 31 and preferably greater than 62.

Numerous experiments have also shown that the stability, homogeneity and density of the rotary fluidized beds requires a minimum hourly mass flow rate of the fluids passing through the rotary fluidized bed that is preferably greater than several hundred times the mass of the rotary fluidized bed. Experiments have shown that the use of a rotary disk makes it possible to reduce the fluid flow rate necessary for obtaining a stable and dense rotary fluidized bed. However, an hourly mass flow rate of the fluids passing through the rotary fluidized bed that is several hundred times greater than the mass of the rotary fluidized bed remains desirable.

In accordance with one particular embodiment of the invention, the hourly mass flow rate of the fluids injected through the circular wall is greater than 200 times and preferably greater than 400 times the mass of said rotary fluidized bed.

When the device is in operation, the rotary fluidized bed rotates within an annular zone (A). It is separated by the centrifugal force from a free central zone (A') that only contains a few solid particles and where the fluids (6) which have passed through the rotary fluidized bed form a free vortex before being discharged through the central outlet openings. The centrifugal force of this free vortex makes it possible to reduce the losses of solid particles that are entrained by these fluids (6), by pushing them back toward the rotary fluidized bed. The free vortex also improves the stability of the rotary fluidized bed. However, this free vortex is very quickly disrupted if it is fed with solid particles or microdroplets of a liquid when the fluid (6) is a gas, for example in order to cool it.

In accordance with one particular embodiment of the invention, a central tube (20.1) or one in the vicinity of the central axis (11) can inject or spray a liquid (2.1) onto at least one face of the rotary disk which has a circular projection (83), in the vicinity of the separating surface (17) between the rotary fluidized bed and the free central zone, within said free central zone which is passed through by a gas. In accordance with this particular embodiment of the invention, said circular projection is profiled so as to disperse, in said free central zone, said liquid in the form of microdroplets, said liquid flowing under the effect of the centrifugal force, in a thin film (9), along the surface of the rotary disk when the device is in operation. The rotary disk can rotate at a very high speed, and the microdroplets can pass into the free central zone without decreasing the force of the free vortex. The evaporation of these microdroplets can dramatically cool the gas (6) a few milliseconds after having passed through the rotary fluidized bed.

In accordance with another particular embodiment of the invention, the central tube (20.1) passing through the side (14) where the fluids (6) are discharged centrally in the gaseous form is connected to a hollow disk (29) for injecting or spraying a liquid (2.1) onto the free circular surface (17) of the rotary fluidized bed. The injection or spraying of this liquid (2.1) preferably takes place in the vicinity of the rotary disk (1) and in a direction at a tangent in order to minimize the disruption to the free vortex. Said hollow disk (29) can also be rotary. This device can be used, for example, for impregnating or coating solid particles.

The devices for obtaining a rotary fluidized bed in a fixed circular chamber can be classified into two families depending on whether the fluids are discharged centrally on one side or both sides of the circular chamber.

In accordance with a first particular embodiment of the invention, the fluids which have passed through the rotary fluidized bed are discharged centrally on one side (14).

In accordance with this first particular embodiment of the invention, said rotary disk is positioned in the vicinity of the lateral wall (13) on the side opposite said one side (14). Its rapid rotation prevents the solid particles from passing into the dead zone of the free vortex, in the vicinity of the central axis, where they would be entrained by the fluids toward the outlet. Its rapid rotation also increases the speed of rotation of the rotary fluidized bed in the vicinity of said rotary disk, this increasing the centrifugal force there and thus the pressure of the rotary fluidized bed on the circular wall along said opposite side. This pressure pushes the fluidized solid particles toward the side where the central outlet or outlets for the fluids are located. The solid particles are slowed by the friction on this side which is fixed. The centrifugal force decreases on this side and the accumulation of the solid particles coming from said opposite side increases the thickness of the fluidized bed on this side. The separating surface between the rotary fluidized bed and the free central zone forms a slope along which the solid particles return toward said opposite side. The presence of the rotary disk in the vicinity of one of the sides thus generates a longitudinal circulation of the solid particles in suspension in the rotary fluidized bed. This longitudinal circulation of the solid particles improves the uniformity of the rotary fluidized bed and generates a transfer of angular moment of rotation between the two sides. The rotary disk thus makes it possible to increase the speed of rotation of the entire rotary fluidized bed, this improving its density and its stability.

Experiments and simulations have shown that the feeding of the solid particles into the rotary fluidized bed is a source of instabilities. In accordance with said first particular embodiment of the invention, the feeding of the solid particles takes place preferably through said opposite side, into the space between the rotary disk and said opposite side. The solid particles thus have to run along the rotary disk before being able to pass into the rotary fluidized bed through the space located between the rotary disk and the circular wall. The friction against the rotary disk gives them a speed of rotation comparable to or greater than that of the rotary fluidized bed while distributing them relatively uniformly. Their penetration into the rotary fluidized bed can take place with a minimum of disruption and even increase its speed of rotation, thereby improving its stability. The solid particles are preferably entrained by a fluid (2) through one or preferably a plurality of tubes (20), preferably in the vicinity of the central axis (11), in order to minimize the asymmetric forces which could be exerted on the rotary disk and cause it to vibrate.

In accordance with one particular embodiment of said first particular embodiment of the invention, the fluids injected via the injection openings through the circular wall, in the vicinity of the rim of the rotary disk, are gases (3.1) and a liquid (2) containing solids in solution or in suspension is injected or dispersed through a tube (20) onto the rotary disk (1), where it forms a thin film (8) under the effect of the centrifugal force, when the device is in operation. Said liquid (2) is ejected along the edge (60) of the outer rim (61) of the rotary disk in the form of microdroplets which are all the smaller the faster the disk rotates and the more its edge (60) forms an acute (sharp) angle.

In accordance with this particular embodiment of the invention, the rotary disk preferably has a relatively wide outer rim (61). This outer rim (61) delimits an annular space (62) between the circular wall and said outer rim (61). The injection device for the fluids makes it possible to inject very hot gases into this annular space through the circular wall in order to evaporate the surface layer of the microdroplets in a very short time, of the order of a few milliseconds, said microdroplets being converted into solid particles which are entrained by these gases toward the rotary fluidized bed, which is passed through by the preferably less hot gases, in order to dry the solids contained in these droplets. This device thus makes it possible to manufacture very fine and dry powders from solids in solution or suspension in a liquid. The solidification of the microdroplets can also be obtained by chemical reactions, for example polymerization, in contact with the gases passing through the rotary fluidized bed.

In accordance with another particular embodiment of said first particular embodiment of the invention, the rotary disk (1) is fixed to a second disk (1.2), at a particular distance (56) from one another. Said second disk (1.2) is perforated by a central opening (26) through which a part of the gases (3.1) injected through the circular wall (15) next to the space separating the two rotary disks can escape. The solid particles (2) fed through the tube (20) into the space between the rotary disk (1) and said opposite side (13) are pushed by the centrifugal force toward the annular zone (B) between the two rotary disks where they form a rotary fluidized bed that is entrained by the two rotary disks and is thus able to rotate very quickly and is thus very dense. They are then transferred toward the annular zone (A), through which a gas (3.2) passes, between the second disk (1.2) and the fixed lateral wall (14) where they form a rotary fluidized bed that is less dense since it is slowed by the friction against the fixed lateral side (14) where the gases are discharged centrally.

In accordance with this particular embodiment of the invention, a central tube (20.1) passing through the side (14) where the fluids are discharged and passing through the central opening (26) in said second disk (1.2) makes it possible to inject or spray a liquid (2.1) onto the surface of the first rotary disk (1), said surface facing said second disk (1.2). Under the effect of the centrifugal force, this liquid forms a thin film (9) which passes into the rotary fluidized bed in the annular zone (B) where it wets the solid particles. The very strong agitation of the solid particles in the zone B makes it possible to distribute the liquid relatively uniformly on the surface of the solid particles. The solid particles are then dried in the annular zone (A). This device thus makes it possible to coat or impregnate solid particles of very small size in a relatively uniform manner.

In accordance with this particular embodiment of the invention, the gas (3.1) is preferably relatively cold so as not to dry the solid particles which have to transfer their excess of liquid to the other particles, and the gas (3.2) is relatively hot in order to rapidly dry the solid particles which rotate in the annular zone (A) of the rotary fluidized bed.

In accordance with a second particular embodiment of the invention, the fluids which have passed through the rotary fluidized bed are discharged centrally from the two lateral sides of the circular chamber and the rotary disk divides said circular chamber into two separate circular zones located on each side of said rotary disk.

Under the effect of the centrifugal force which is increased along the rotary disk, the longitudinal circulation of the rotary fluidized bed in each annular zone takes place along the circular wall (15) from the rotary disk toward the sides and along the separating surface (17) from the sides toward the rotary disk. The exchanges of solid particles between the two zones depend on the distance (41) between the rim of the disk and the circular wall.

In accordance with one particular embodiment of said second particular embodiment of the invention, the rotary disk comprises openings (90) located at a distance (42) from the circular wall that is less than the desired thickness (31) of the rotary fluidized bed in each annular zone. This makes it possible to direct the circulation of solid particles between the two zones, depending on the differences in pressure and density of the rotary bed in the two annular zones. These differences are influenced by the flow rates, the densities and the speeds of injection of the fluids in each annular zone and by the discharging pressures of these fluids. For example, the speed of rotation of the rotary fluidized bed is normally greatest in a first annular zone where the flow rate, the density and the speed of injection of the fluids are greatest. The pressure of the rotary fluidized bed on the circular wall is therefore greater in said first annular zone. In this case, if the pressures of the fluids along the free circular surfaces (17.1) and (17.2) are controlled so as to be approximately equal, the solid particles move from said first annular zone toward the other annular zone along the circular wall and return toward said first annular zone through the openings (90).

It is not generally easy to control this circulation. In accordance with a preferred embodiment of the invention, said openings (90) are profiled, preferably with the aid of small fins, so as to push or suck the solid particles in the desired direction. In this case, the circulation of the solid particles from one annular zone to the other depends on the difference in the speed of rotation between the rotary disk and the rotary fluidized bed.

In accordance with another particular embodiment of said second particular embodiment of the invention, the outer rim of the rotary disk comprises passages, comparable to the spaces between the teeth (70) of a toothed wheel, and these teeth or passages are profiled so as to encourage the passage of the solid particles from one annular zone to the other in the desired direction. These teeth or passages can be extended by fins which push or suck the solid particles in the desired direction.

These different particular embodiments of said second particular embodiment of the invention make it possible to separate the fluids (6.1) and (6.2) which have passed through the rotary fluidized bed of the separate annular zones, (A) and (B), respectively, while controlling the transfer of the solid particles from one zone to the other. This makes it possible, for example, to control the difference in temperature between the two annular zones if one is passed through by hot fluids and/or fluids that generate exothermic reactions and if the other annular zone is passed through by cold fluids and/or fluids that generate endothermic reactions.

In accordance with another particular embodiment of said second particular embodiment of the invention, the rotary disk (1) is attached to a second rotary disk (1.2) comprising a central opening (26) through which a part of the fluids (3.1) injected through the circular wall (15) next to the space separating the two disks can escape through the outlet opening (21.1). A central tube (20.1) or a tube (20) in the vicinity of the central axis (11) makes it possible to feed a liquid (2.1) or solid particles (2) possibly entrained by a fluid through said central opening (26) and into the space separating the two rotary disks. The centrifugal force pushes said liquids or solid particles in the space between the two disks toward the periphery, where they are ejected toward the circular wall in the rotary fluidized bed of the annular zone (A) or (B). The shape of the periphery of the two rotary disks can be selected so as to encourage the ejection of the liquids or solid particles in the desired longitudinal direction.

In accordance with another particular embodiment of said second particular embodiment of the invention, the rotary disk (1) is hollow and comprises orifices (89) along its periphery. A central tube (20.2) makes it possible to feed a fluid (2.4) through the rotating shaft (11) into the interior of the hollow rotary disk. These fluids (2.4), which can entrain solid particles or contain solids in solution, are ejected through said orifices (89) into the interior of the rotary fluidized bed in the desired direction.

The present invention also relates to the processes for converting solid particles, such as the drying, extraction of volatiles from, coating, impregnation, roasting, pyrolysis and gasification of bioparticles or other solid particles or liquids that react in contact with the fluids passing through the rotary fluidized bed, and also to the processes for converting fluids that pass through the rotary fluidized bed and react in contact with the solid particles in suspension in the rotary fluidized bed using this device. Said solid particles may be, at least in part, catalysts that encourage said conversion. The present invention also relates to the processes for manufacturing powders from microdroplets produced by said device, by means of the evaporation of liquids containing solids in solution or in suspension or by means of chemical reactions, such as the polymerization of said microdroplets.

When these conversions require provision of heat or refrigeration, the rotary fluidized bed can be passed through by a fluid which has been heated or cooled outside the circular chamber. For example, the catalytic polymerization of ethylene is a very exothermic reaction. The ethylene which passes in a few milliseconds through the rotary fluidized bed containing catalytic particles can be recycled after having been cooled.

This provision of heat can be carried out at different temperatures, in different annular zones of the rotary fluidized bed. For example, the use of a double rotary disk, as described in FIG. 4, or of a rotary disk having an enlarged outer side, as described in FIG. 3, makes it possible to delimit an annular zone between the rotary disk or disks and the circular wall (15). This annular zone can be passed through by a very hot gas, for example in order to very rapidly evaporate the surface moisture on solid particles or microdroplets containing dissolved solids. More progressive drying can take place in that part of the rotary fluidized bed through which a less hot gas passes. Conversely, a cold gas can pass through this annular zone in order to preserve or regularize the distribution of the liquid with which the solid particles circulating in this annular zone are coated, these solid particles being dried in that part of the rotary fluidized bed through which a hot gas passes.

Heat or refrigeration can also be provided with the aid of the circulation of the solid particles between two annular zones separated by the rotary disk or disks, one of the zones having an exothermic reaction and the other zone having an endothermic reaction.

For example, the pyrolysis of solid carbon particles can be carried out in an annular zone (B) of the rotary fluidized bed, while the partial combustion of the residual carbon of these particles may be carried out in an annular zone (A), the two zones being separated by one or more rotary disks. The transfer of the solid particles from the annular zone (A) to the annular zone (B) provides the heat necessary for the pyrolysis and the transfer of the solid particles from the annular zone (B) to the annular zone (A) provides the combustible materials necessary for the production of heat by their combustion. A device similar to those which are described in FIGS. 5 to 7 may be suitable for this application.

Such devices can be used for the conversion of fluids passing through the rotary fluidized bed. For example, the catalytic and/or thermal cracking of hydrocarbons can be carried out in an annular zone (A) of the rotary fluidized bed, the hydrocarbons being fed into said annular zone (A) in a gaseous or liquid form, and the residual carbon which is deposited on the solid particles can be burned off in the annular zone (B). The annular zone (B) can also be heated by the combustion of gases injected through the circular wall, for example hydrogen and oxygen. The hydrocarbons which have been converted while passing through the rotary fluidized bed can be cooled dramatically by the spraying of fine droplets of water into the central zone (A') with the aid of the rotary disk provided with a suitably profiled projection.

The use of one or more rotary disks thus has numerous advantages:

They increase the speed of rotation of the rotary fluidized bed and thus its density and its stability. They also increase the speed of rotation of the fluids in the free central zone and encourage the formation of a powerful free vortex which makes it possible to reduce the losses of solids entrained by the fluids which have passed through the rotary fluidized bed and thereby to improve the separation of the fluids and the solids along the surface (or thin zone) which separates the rotary fluidized bed from the free central zone. They make it possible to feed the solid particles into the interior of the rotary fluidized bed without significantly disrupting it and thus without causing instabilities. They also make it possible to cool the gases in the free zone by using the rotary disk to spray microdroplets of cooling liquids into said free zone without significantly disrupting the free vortex and thereby to cool these gases, a few milliseconds after having been converted by passing through the rotary fluidized bed. They also make it possible to separate the fluids which have passed through the annular zones of the rotary fluidized bed that are located on either side of the disk or disks. If the rotary disk is equipped with passages or openings that are suitably profiled and are possibly equipped with guide fins, it can control the exchanges of solid particles and thus the transfer of heat from one annular zone to the other. They are also particularly useful for producing solid microparticles from microdroplets and for coating or impregnating solid microparticles.

DEFINITIONS

A "circular wall" is understood to mean a wall surrounding a central axis, with a shape generally having cylindrical symmetry but the surface of which may be polygonal and/or have different curvatures, for example concave and/or convex curvatures, and the cross sections of which may have different sizes and shapes. For example, the circular wall may have the shape of the polygonal surface having cylindrical symmetry of a cone frustum.

A "free circular surface of the rotary fluidized bed" is understood to mean the circular zone of separation between the rotary fluidized bed, where the concentration of the solid particles is high, and the free central zone, where the concentration of the solid particles is very low. When the rotary fluidized bed is relatively stable and dense, the separation between the fluids which have passed through the rotary fluidized bed and the solid particles is carried out very rapidly and the circular zone of separation of the fluids and the solids is relatively thin and similar to a circular surface.

The word "fluid" is used when the fluid may be in the liquid or gaseous state or a mixture of the two states.

The word "gas" is used when the fluid is in the gaseous state and the word "liquid" is used when the fluid is in the liquid state.

The word "injecting" relates to a feeding of fluid through openings that are preferably small or narrow. The word "spraying" relates to the feeding of a liquid in the form of fine droplets. The word "feeding" is general. It includes injecting and spraying.

DETAILED DESCRIPTION

Figure 1:
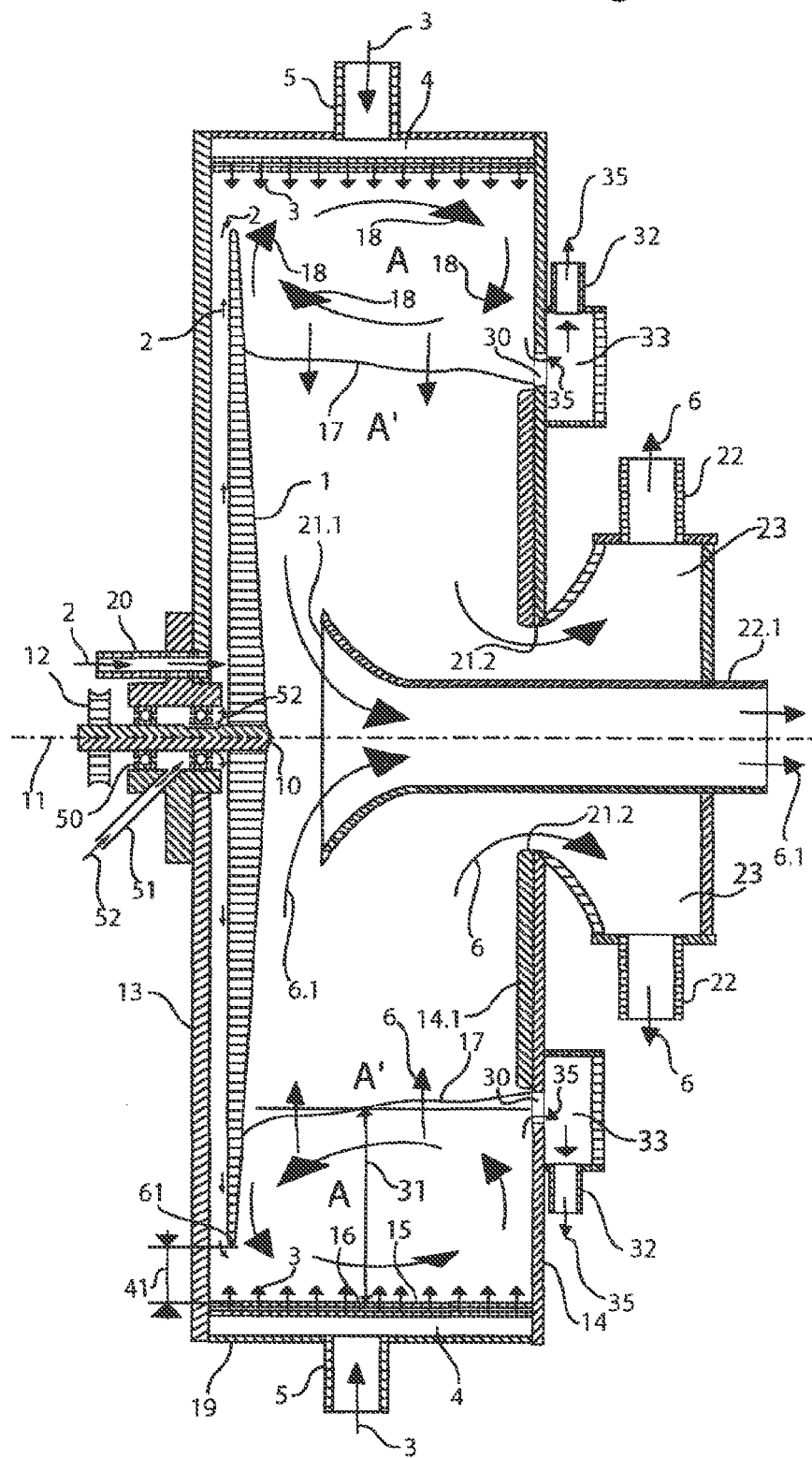
FIG. 1 shows the longitudinal section through an example of a device for obtaining a rotary fluidized bed within a fixed circular chamber with a central discharge of the fluids that have passed through the rotary fluidized bed through one of the two sides of the circular chamber, and a rotary disk located in the vicinity of the opposite side.
Figure 2A:
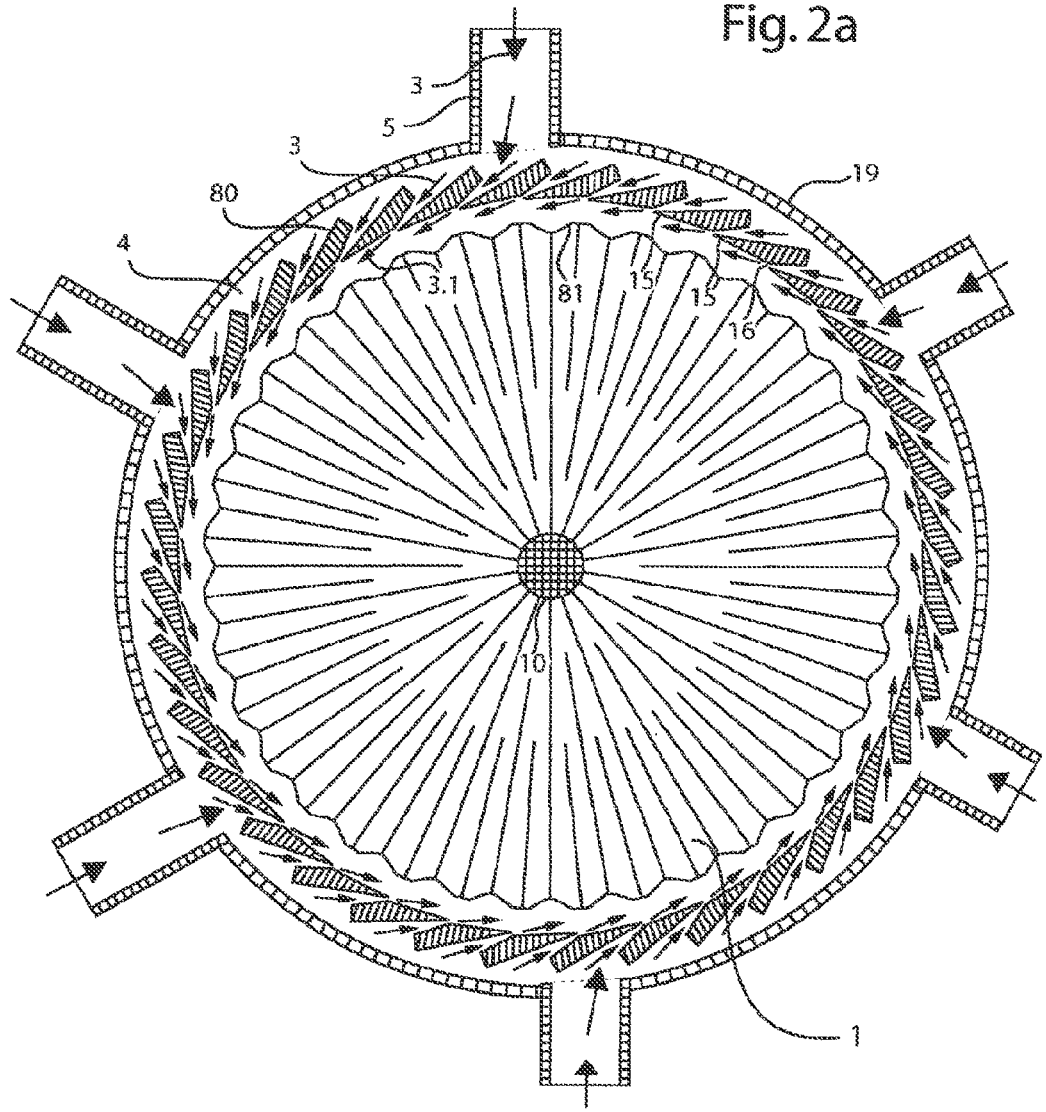
FIG. 2a shows an example of a cross section through the device from FIG. 1 through the rotary disk.
Figure 2B:
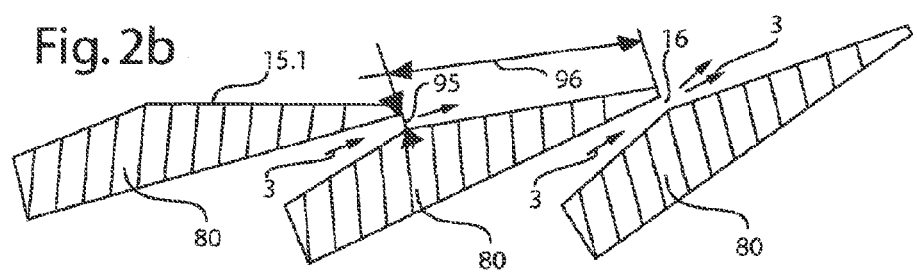
FIG. 2b shows an enlargement of the cross section through 3 panels (80) forming the circular wall (15).
Figure 3:
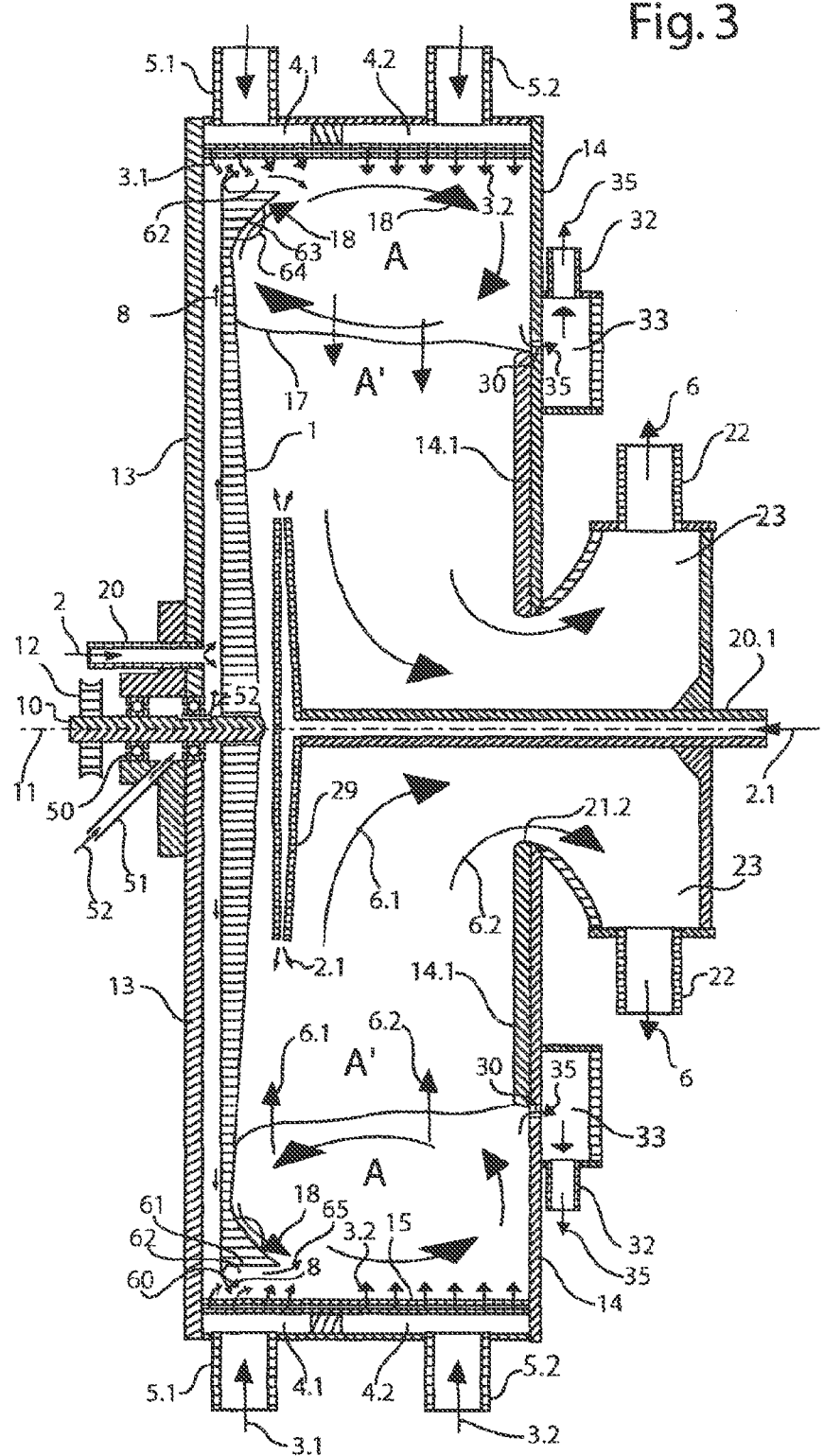
FIG. 3 shows the longitudinal section through a device similar to the device in FIG. 1, where the device for feeding fluids through the circular wall makes it possible to feed different fluids or fluids at different temperatures through two annular zones of the fixed circular wall, having a central device for spraying a liquid (2.2) into the interior of the free annular zone (A') and having a rotary disk, the shape of the periphery of which has been modified.
Figure 4:
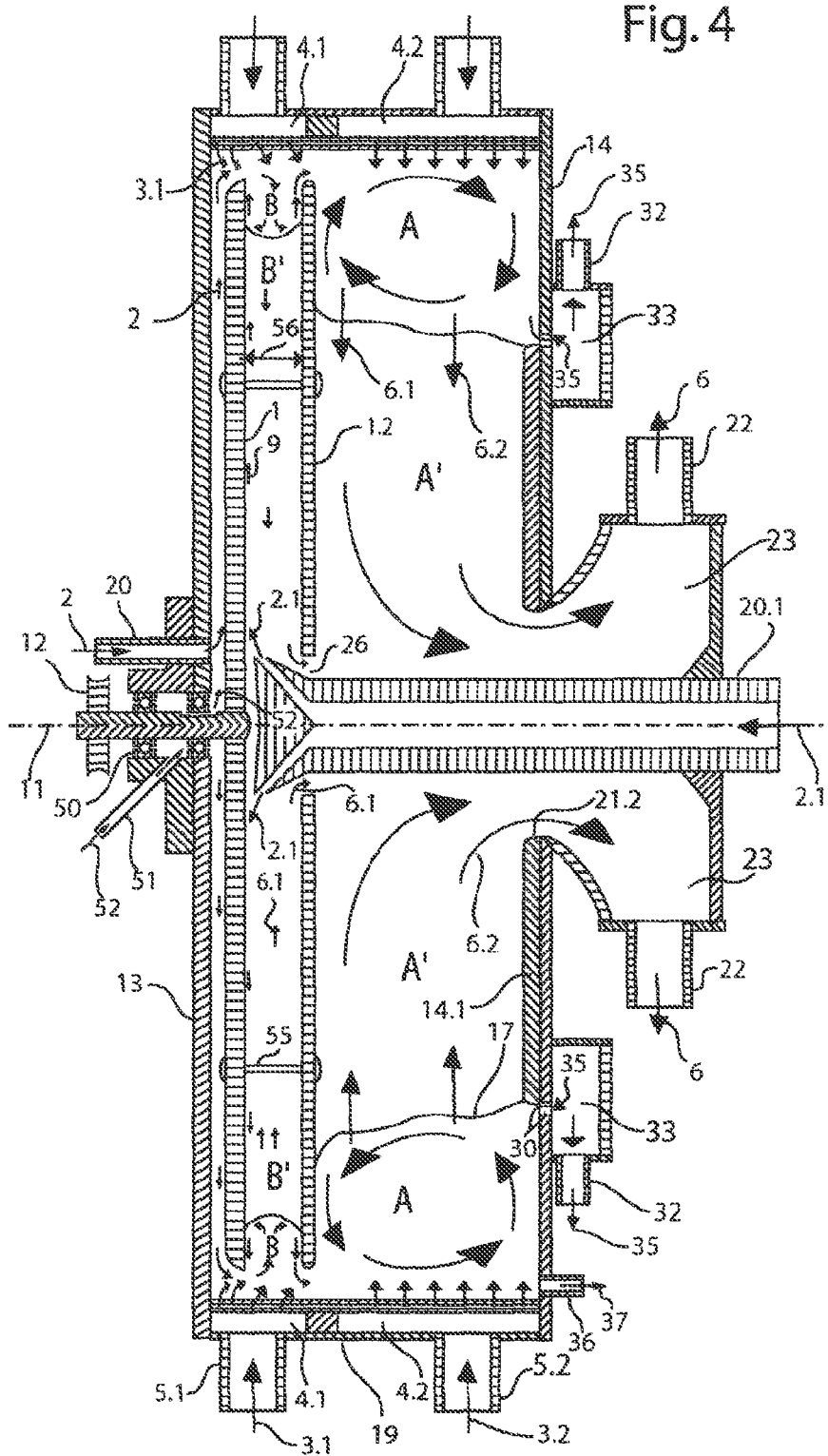
FIG. 4 shows the longitudinal section through a device similar to the device in FIG. 3, having a double rotary disk (1.1) and (1.2).

FIGS. 1, 3 and 4 relate to the particular embodiment of the invention in which the fluids which have passed through the rotary fluidized bed are discharged centrally through one of the two lateral walls of the circular chamber, using different examples to illustrate different embodiments of the invention. FIGS. 5 to 8 illustrate the particular embodiment of the invention in which the fluids that have passed through the rotary fluidized bed are discharged centrally through the two lateral walls of the circular chamber, using further examples. FIG. 2 relates to either of the two particular embodiments of the invention.

FIG. 1 shows the longitudinal section through an example of a device for obtaining a rotary fluidized bed through which fluids which have been discharged centrally from the same lateral side (14) pass. This device comprises a circular chamber delimited by two lateral walls (13) and (14) and by a circular wall (15) through which a large number of openings pass, for example slots (16) for injecting one or more fluids (3) in a direction mainly at a tangent to said circular wall. In this example, the lateral walls are flat. They could have some other shape, for example a concave or convex curvature. The diameter of the circular chamber is constant. It could have different dimensions.

The device for feeding the fluids (3) comprises a set of tubes (5) for feeding the fluids (3) into a feeding chamber (4) surrounding the circular wall (15), within the outer wall (19) surrounding the circular wall.

The device for the central discharge of the fluids (6) and (6.1) which have passed through the rotary fluidized bed comprises, in this example, a central outlet opening (21.1) connected to a tube (22.1) around the central axis (11) for discharging the fluids (6.1) which have passed through the rotary fluidized bed and the free central zone in the vicinity of the rotary disk, and a second central outlet opening (21.2) around the tube (22.1) for discharging the fluids (6) through an annular space (23) via a set of discharge tubes (22).

The device for feeding solids (2) comprises, in this example, at least one feeding tube (20) located on the side (13) next to the rotary disk, in the vicinity of the central axis (11). The solids can, for example, be fed via a helical screw and/or be entrained by a fluid or in solution in a fluid.

The device for discharging the solid particles comprises a set of outlet openings (30) through the lateral wall (14) at the distance (31) from the circular wall that corresponds to the desired thickness of the rotary fluidized bed when the device is in operation. In this example, these outlet openings are connected to a set of tubes (32) for discharging the solids through an annular chamber (33). An annular lateral wall (14.1) forms an obstacle for the solid particles which are entrained by the fluids toward the central axis, along the lateral wall (14). It thus encourages the accumulation of the solid particles in front of the outlet openings (30) for the solids and discourages losses of solids on account of their entrainment by the fluids toward the central outlet along the lateral wall where the speed of rotation and thus the centrifugal force is lowest.

The rotary disk (1), located in the vicinity of the lateral side (13) opposite the lateral side (14), is fixed to a rotary shaft (10) which is located along or in the vicinity of the central axis (11) and is connected to a motor, symbolized by a pulley (12), for rotating the rotary disk. The diameter of the rotary disk (1) is large enough for the distance (41) between the outer rim of the rotary disk and the circular wall (15) to be less than the desired thickness (31) of the rotary fluidized bed when the device is in operation.

The circular zone of separation between the rotary fluidized bed (A) and the free central zone (A') is represented by the free circular surface, the section of which is symbolized by the wavy line (17).

In this example, the rotating shaft (10) is held by ball bearings (50). A tube (51) makes it possible to inject a fluid (52) between the ball bearings so that it passes into the central space between the lateral side (13) and the rotary disk (1) through an opening between the rotating shaft and the bearing close to the rotary disk, in order to prevent the solid particles from approaching the ball bearings. This device significantly reduces wear to the ball bearings and allows them to be cooled, if necessary.

When the device is in operation, the fluids (3) are injected at a tangent into the slots (16), through the circular wall (15). They rotate the solid particles which form a rotary fluidized bed (A), rotating along the circular wall about the central axis (11). The rotary fluidized bed is delimited by the circular wall (15) and by a free circular surface (17) which is the separating surface between the rotary fluidized bed A and the free central zone (A') which only contains a few solid particles. After having passed, rotating, through the rotary fluidized bed, the fluids (6.1) and (6) are discharged centrally through the outlet openings (21.1) and (21.2).

The thickness (31) of the rotary fluidized bed depends on the quantity of solids it contains. If the feed of solid particles is continuous, the thickness of the rotary fluidized bed increases until its free surface (17) reaches the outlet openings (30) for the solid particles. The solid particles (35), entrained by the fluid, are discharged via the tubes (32) through the annular chamber (33). The position of the outlet openings (30) makes it possible to control the thickness (31) of the rotary fluidized bed.

The rotary disk (1) is driven by the rotating device, symbolized by a pulley (12), in the same direction and at a speed of rotation greater than the desired speed of rotation of the rotary fluidized bed (A). The friction accelerates the speed of rotation of the fluids and the solids which come into contact with the rotary disk. The friction against the rotary disk also rotates the solids (2) and the fluids which entrain the solids, fed via the tube (20). The centrifugal force pushes them toward the circular wall (15) and they pass into the rotary fluidized bed at a speed of rotation comparable to the speed of rotation of the rotary fluidized bed. The rotation of the disk also makes it possible to distribute the fluids and the solids (2) relatively uniformly along the periphery of the rotary disk in order that the feed of the solids does not create instabilities in the rotary fluidized bed.

The friction between the rotary disk and the rotary fluidized bed increases the speed of rotation of the rotary fluidized bed in the annular zone close to the rotary disk. The centrifugal force there is thus greater, thereby decreasing the thickness of the rotary fluidized bed and increasing its density on this side (13). The speed of the solid particles is slowed by the friction against the opposite side (14), thereby decreasing the centrifugal force and thus the density of said rotary fluidized bed, thereby increasing its thickness in the annular zone close to this side (14). The difference in density and thickness of the rotary fluidized bed, due to the speed of rotation gradient of the rotary fluidized bed between the different annular zones, brings about longitudinal circulation of the solid particles, symbolized by the arrows (18). This circulation allows a very rapid transfer of the solids from one side to the other. It allows a good transfer of heat or refrigeration from one side to the other, and a good transfer of angular moment of rotation between the rotary disk and the rotary fluidized bed over the entire rotary fluidized bed, thereby improving its uniformity, its mean density and its stability.

The rotary disk may be smooth. In this case, the relatively low friction allows a much higher speed of rotation of the disk than the speed of rotation of the fluidized bed. This very high speed of rotation is favorable for the formation within the free central zone (A') of a free vortex which prevents the solid particles from being entrained by the fluids (6) and (6.1) toward the central outlet openings. If a very high speed of rotation of the disk is not desirable, the friction may be increased by modifying the surface of the disk which is in contact with the rotary fluidized bed, for example by giving it the profile of a toothed wheel, as in the example in FIG.

2, or with the aid of small fins (64) or of protuberances along a part (63) of its surface that is in contact with the rotary fluidized bed, as shown in the example in FIG. 3. This increases the transfer of angular moment of rotation between the rotary disk and the rotary fluidized bed and makes it possible to achieve the desired speed of rotation of the rotary fluidized bed and thus the desired stability and homogeneity, without requiring a much higher speed of rotation of the disk.

In this example, the central opening (21.1) makes it possible to increase the quantity of fluids (6.1) that run along the rotary disk (1), decreasing the discharging pressure of the fluids (6.1). This makes it possible to better distribute the flows of fluids (6) and (6.1) through the free circular surface (17) and to reinforce the forces of the free vortex when the speed of rotation of the disk (1) is very high.

This device can, for example, be used for the drying of or extraction of volatiles from solid particles fed via the tube (20). In this case, the fluid (3) which passes through the rotary fluidized bed is a gas. The presence of the rotary disk rotating more quickly than the desired speed of rotation of the rotary fluidized bed makes it possible to improve the stability, density and uniformity of the rotary fluidized bed. In this example, it also makes it possible to feed the solid particles without bringing about instabilities in the rotary fluidized bed.

FIG. 2a shows the cross section, along the rotary disk, of a device similar to the device in FIG. 1. The fluid (3) is introduced into the feeding chamber (4) via 6 tubes (5) through the cylindrical envelope (19). The circular wall (15) is formed by a set of 36 longitudinal panels (80), which are fixed in the lateral walls (13) and (14) shown in FIG. 1. The fluid (3) is injected into the circular chamber through longitudinal slots (16) between the panels (80). The periphery of the rotary disk (1), the section of which is shown by radial hatching, is wavy so as to increase the friction and thus the transfer of angular moment of rotation to the solid particles. The rotary disk (1) is fixed to the rotating shaft (10).

FIG. 2b shows the cross section through the enlargement of three panels (80) of which the flat surfaces (15.1) form the circular surface (15) of the circular chamber. In this example, this circular surface is thus polygonal. The flat surfaces (15.1) could have other shapes, for example with concave or convex curvatures. The space between the panels forms the longitudinal slots (16), that is to say perpendicular to the plane of the figure, of a thickness, $\epsilon i$, corresponding to the minimum distance (95) between the panels. The fluids (3) are injected into the circular chamber through these longitudinal slots in a direction that is mainly at a tangent, that is to say parallel to the surfaces (15.1). The width (96) of the surface of these panels (80) forming the circular surface of the circular chamber is the distance, di, separating two consecutive slots.

Numerous experiments have shown that, in order to obtain a relatively stable, homogeneous and dense rotary fluidized bed in a circular chamber, while limiting the action of the rotary disk, it is desirable to respect the following empirical conditions:

The square of the ratio between the surface area of the circular wall (15) and the sum of the surface areas of said injection openings (16) must be preferably greater than 200 times the ratio between the diameter of the circular chamber, D, and the mean diameter of the solid particles, d, multiplied by the ratio between the density of the fluids, $\rho f$, and the density of the solids, $\rho s$. In this example, the ratio of the surface areas is approximately equal to the ratio of the distance (96) or di between the injection slots of the fluids and the thickness of the injection slots (95) or $\epsilon i$.

I.e.: $(di/\epsilon i)^2 > 200 \cdot (D/d) \cdot (\rho f/\rho s)$.

It is generally desirable to have a large number of injection slots, preferably equal to or greater than 30, and a thickness of slots that is preferably less than ten times the size of the solid particles. It is also desirable to have an hourly mass flow rate of the fluids which pass through the rotary fluidized bed of greater than several hundred times the mass of the rotary fluidized bed.

FIG. 3 shows another example of a device similar to the device in FIG. 1. The edge (60) of the outer rim (61) of the rotary disk (1), said edge being located near the lateral wall (13), is sharp. This outer rim (61) is widened and set back somewhat on the other side, so as to delimit an annular channel (62) with the circular surface (15). In this example, the surface (63) of the rotary disk which is in contact with the rotary fluidized bed, rotating in the annular zone (A), is profiled so as to send the solid particles (63) toward the opposite side (14). This surface may comprise fins (64) or protuberances, which improve the transfer of angular moment of rotation of the rotary disk (1) to the rotary fluidized bed.

In this example, the device for feeding the fluids through the circular wall makes it possible to feed two different flows of fluids (3.1) and (3.2) through two separate feeding chambers (4.1) and (4.2). The device for the central discharge of the fluids only comprises one central outlet opening (21.2).

This device can be used, for example, for producing powder or microparticles. In this case, the tube or tubes (20) are designed to feed a liquid (2) containing microparticles in suspension or solids in solution into the liquid. This liquid is injected or sprayed onto the surface of the rotary disk (1). When the device is in operation, the liquid forms a thin film (8) which is expelled, in the form of microdroplets (65), by the centrifugal force of the sharp edge (60) of the rotary disk. The droplets are all the smaller the faster the disk rotates and the sharper its edge is. A very hot gas (3.1) evaporates, in a very short period of time, the surface of the microdroplets which are entrained in the annular channel (52) toward the rotary fluidized bed (A), where they are progressively dried by a less hot gas (3.2) which passes through the rotary fluidized bed. They are then discharged through the outlet openings (30). The solidification of the microdroplets can also be obtained by chemical reactions, for example polymerization, in contact with the gases passing through the rotary fluidized bed.

This example also comprises a central tube (20.1) connected to a hollow disk (29) for spraying a liquid (2.1), in the form of microdroplets, in the vicinity of the free circular surface (17) of the rotary fluidized bed through which a gas (6.1) passes. This hollow disk (29) is fixed or rotary and the injection of the microdroplets is carried out preferably in a direction at a tangent to and in the vicinity of the rotary disk in order to disturb the free vortex in the free central zone as little as possible. This device can be used to impregnate or coat the solid particles of the rotary fluidized bed.

FIG. 4 shows another example of a device similar to the device in FIGS. 1 and 3. A second rotary disk (1.2) is attached to the rotary disk (1), at a distance (56), by rivets (55). A central tube (20.1) passes through the central outlet opening (21.2) and a central opening (26) in the second rotary disk (1.2). This central tube (20.1) allows the injection or spraying of a liquid (2.1), which can entrain solids or contain solids in solution, onto the inner surface of the first rotary disk (1).

The device for feeding fluids comprises two feeding chambers (4.1) and (4.2) for feeding two fluids (3.1) and (3.2) which are different and/or at different temperatures and different pressures in the annular zones (A) and (B).

This device can be used, for example, for impregnating or coating solid particles. Specifically, when the device is in operation, a liquid (2.1) injected or sprayed through the central tube (20.1) onto the rotary disk (1) is pushed by the centrifugal force toward the outer rim of this rotary disk, forming a thin film (9). The solid particles in suspension in a flow of gas (2), which are fed through the central tube (20), form a relatively cold rotary fluidized bed in the annular zone (B), between the two rotary disks, a part of the gases (3.1) passing through said rotary fluidized bed. After having passed through the rotary fluidized bed of the annular zone (B) the gases (6.1) can escape through the central opening (26) toward the central opening (21.2). The solid particles which rotate in the annular zone (B) are wetted by the liquid (2.1) in contact with the liquid film (9) along the inner surface of the disk (1). The numerous collisions between the solid particles in the interior of the annular zone (B) distribute this liquid in a relatively uniform manner over the solid particles. The surplus gas (3.1) entrains the solid particles toward the annular zone (A) of the rotary fluidized bed, where they can be dried by a flow of hot gases (3.2) which pass through the rotary fluidized bed. The dried solid particles are discharged through the outlet openings (30).

The presence of the second disk is not indispensable for coating or impregnating solid particles. However, it is desirable to have a distinct zone, zone B, where the moisture of the solid particles is preserved for a sufficiently long time, in order to allow their coating or impregnation to be made uniform. It is thus desirable for this zone to be separate from the drying zone. The second disk is also desirable if the central tube (20.1) is used for feeding solid particles entrained by a gaseous fluid, in order to avoid a significant part of the solid particles being pushed back, via the central opening (26) in the rotary disk (1.2), toward the central chimney (21.2) before they have reached the rotary fluidized bed.

The distance (56) between the two rotary disks and the flow rate of gas (6.1) influence the residence time of the solid particles in the annular zone (B) and thus the uniformity of their coating or impregnation. The very strong agitation of the rotary fluidized bed normally prevents the formation of agglomerates. If, however, agglomerates do form, they tend to remain along the circular wall, since they are heavier. A tube (36) for discharging solids, said tube being located along the circular wall, makes it possible to discharge the heaviest solid particles (37) continuously or intermittently.

Figure 5:
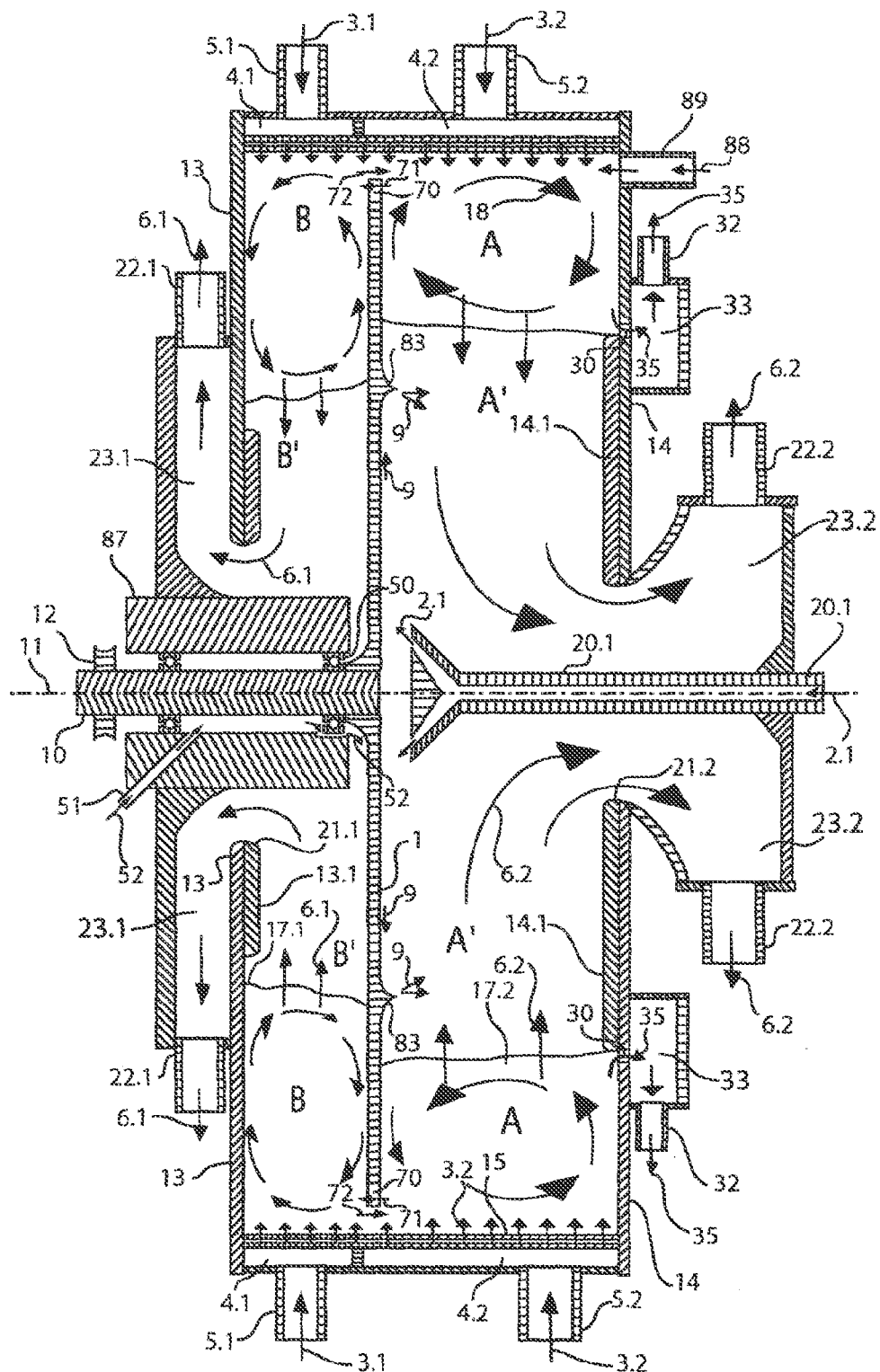
FIG. 5 shows the longitudinal section through an example of a device for obtaining a rotary fluidized bed within a fixed circular chamber with a central discharge of the fluids that have passed through the rotary fluidized bed through the two opposite sides of said fixed circular chamber, and having a rotary disk (1) located between said opposite sides, separating the circular chamber into two annular zones.

FIG. 5 shows the longitudinal section through an example of a device for obtaining a rotary fluidized bed through which fluids pass which are discharged centrally on the two lateral sides (13) and (14). It is characterized in that it comprises a rotary disk (1) which separates the circular chamber into two circular zones. A rigid support (87) keeps the rotary disk (1) at a certain distance from the lateral side (13). The fluid (52) injected via the tube (51) serves to prevent the solid particles entrained by the fluid (6.1) from clogging the ball bearings (50). It can also serve to cool the latter.

Figure 7:
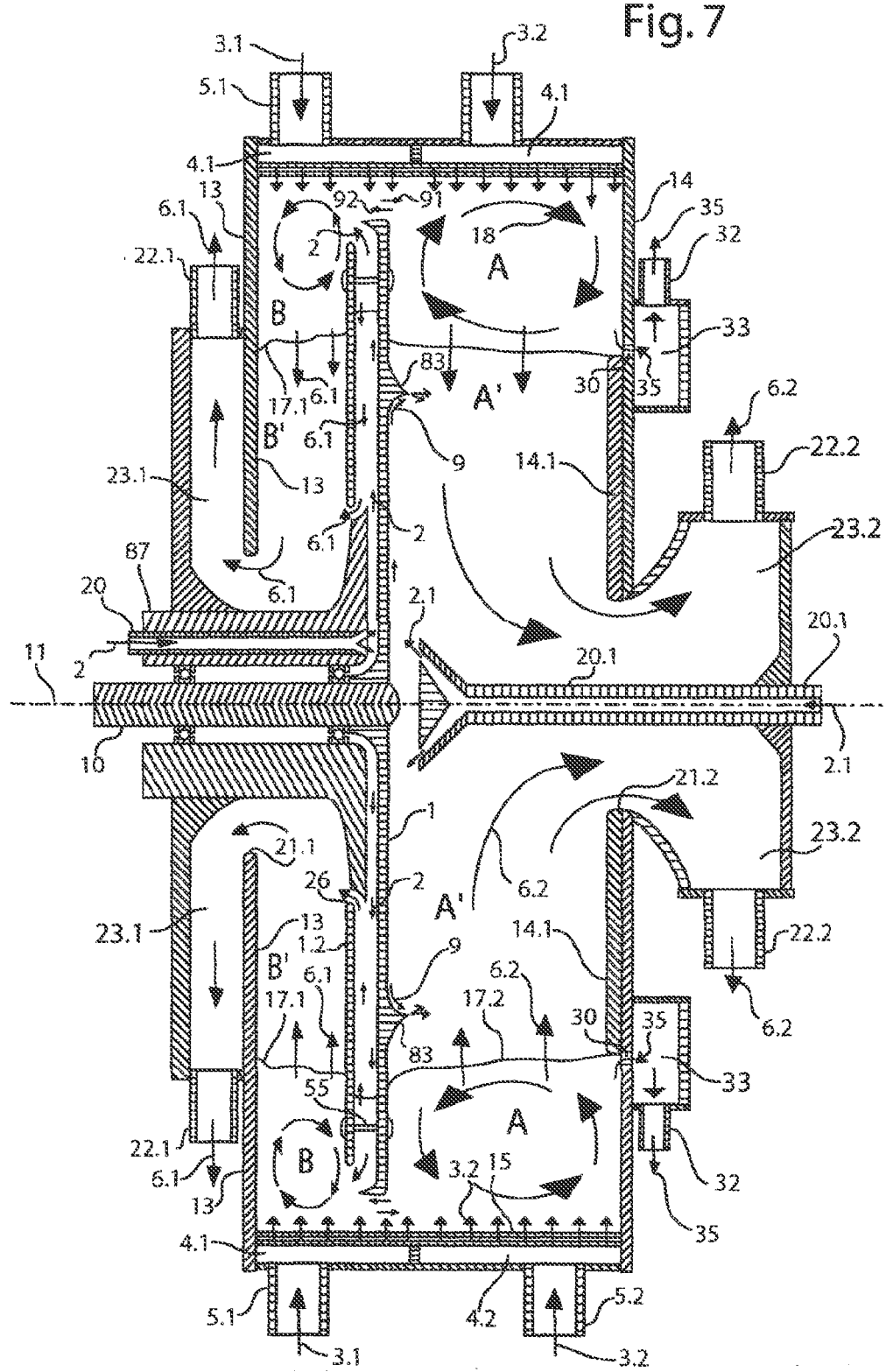
FIG. 7 shows the longitudinal section through a device similar to the device in FIG. 5, having a double rotary disk.
Figure 8:
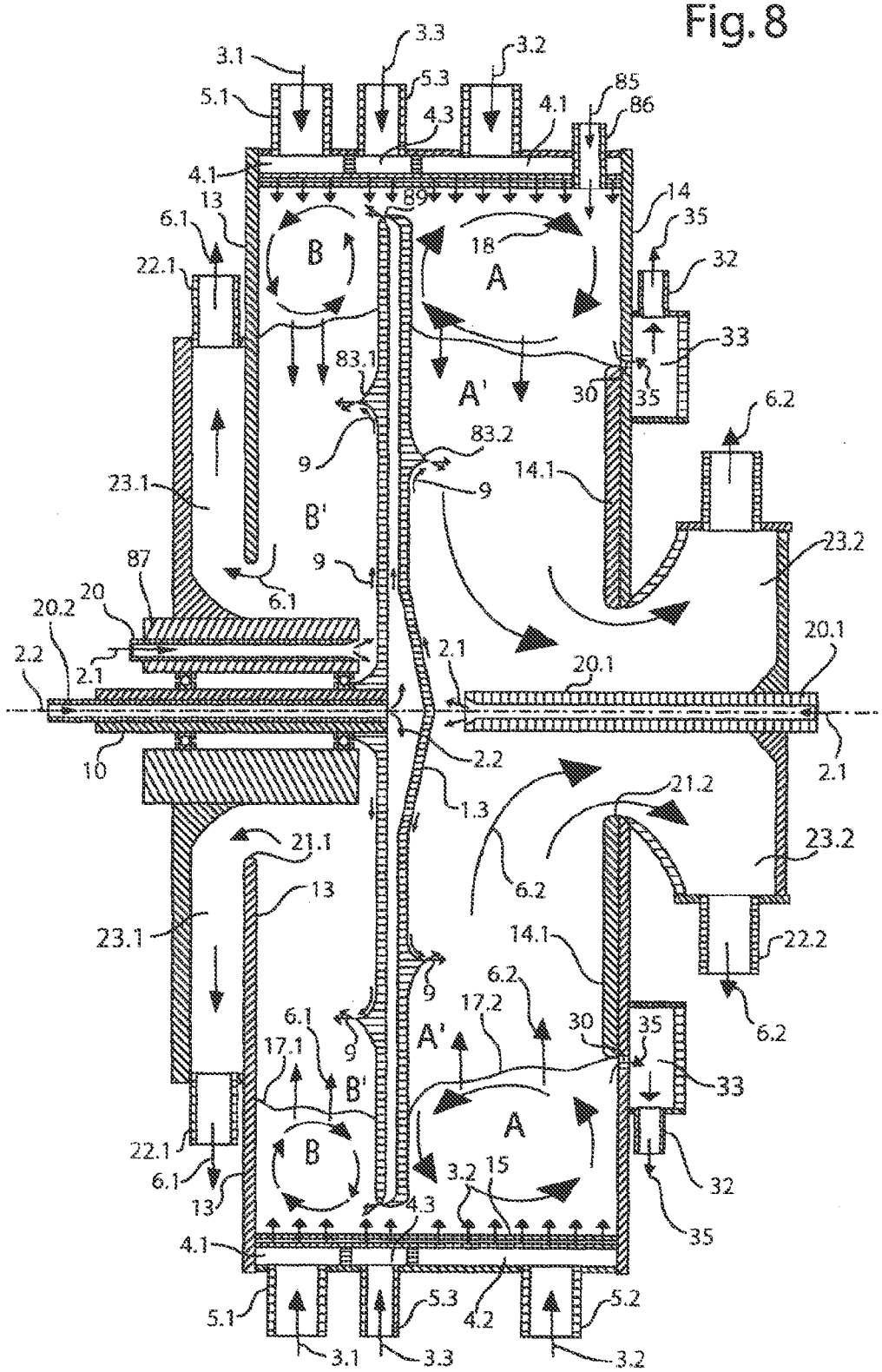
FIG. 8 shows the longitudinal section through an example of a device similar to the one in FIG. 5, having a hollow rotary disk or a double rotary disk that is fed centrally through the rotating shaft of the rotary disk.

Compared with FIG. 1, the central discharge of the fluids (6.1) and (6.2) that have passed through the annular zones (B) and (A), respectively, takes place in each case via the sets of tubes (22.1) and (22.2) through annular chambers (23.1) and (23.2) via the two central outlet openings (21.1) and (21.2) that are located on either side of the rotary disk (1), rather than being concentric and on the opposite side of the rotary disk. In this example, there are two feeding chambers (4.1) and (4.2) which can feed fluids (3.1) and (3.2) that are different and/or at different temperatures and different pressures on either side of the rotary disk. There is no feeding of fluids and/or solids (2) against the rotary disk, although this is possible, as is shown in FIGS. 7 and 8. The feeding of solids (88), optionally entrained by a fluid, takes place via the tube (89) through the lateral wall (13) or the circular wall (15), as in the case of the tube (86) shown in FIG. 8. These two devices for feeding solids into the rotary fluidized bed have a negative influence on the stability and density of the rotary fluidized bed in the annular zone (A). A central device for feeding solids, for example between the two rotary disks, as in the example in FIG. 7, is preferable.

The central tube (20.1) makes it possible to inject or spray a liquid (2.1) onto the rotary disk (1) when the fluid (6.2) is a gas. Under the effect of the centrifugal force, this liquid (2.1) flows in the form of a thin film (9). A circular projection (83), which is suitably profiled and located on the rotary disk within the free central zone (A'), disperses this liquid within said free central zone (A') in the form of microdroplets which can cool the gas (6.2) without disrupting the free vortex if the rotary disk is rotating sufficiently quickly. This device makes it possible to cool the gas (6.2) a few milliseconds after having passed through the rotary fluidized bed.

The exchanges of solid particles between the two annular zones (A) and (B) take place through the space which separates the outer rim of the rotary disk (1) from the circular wall (15). They are relatively numerous on account of the strong turbulence in the rotary fluidized beds. They depend on the distance between the periphery of the rotary disk and the circular wall.

The rotary disk also allows forced and controlled circulation of solid particles between the two zones, as shown in this example, by virtue of the passages along the periphery of the rotary disk. These passages are equivalent to the spaces separating the teeth (70) of a toothed wheel. These teeth are profiled so as to push or suck the solid particles (71) in the desired direction, from the annular zone (A) toward the annular zone (B) in this example, when the rotary disk rotates more quickly than the rotary fluidized bed. The solid particles (72) return from the annular zone (B) toward the annular zone (A) under the effect of the difference in pressure due to the accumulation of solid particles in suspension in the annular zone (B). The rate of exchanges of solid particles between the zones (A) and (B) can be controlled by the speed of rotation of the rotary disk (1). The excess solid particles (35) are discharged through the outlet openings (30).

The difference in thickness of the rotary fluidized bed between the annular zones (A) and (B) depends on the differences in density of the rotary bed between each zone, this depending on the differences in the speed of rotation of the rotary fluidized bed and the flows of fluids which pass through the fluidized bed. It also depends on the differences in the discharge pressure for the fluids (6.1) and (6.2). These differences in thickness can only vary within reasonable limits. It is thus necessary to have a device which makes it possible to control them; for example, a device for controlling the differences in pressure between the free central zones (A') and (B'), said device being connected to the device for discharging the fluids, in order to keep these differences in pressure at the desired level.

Figure 6:
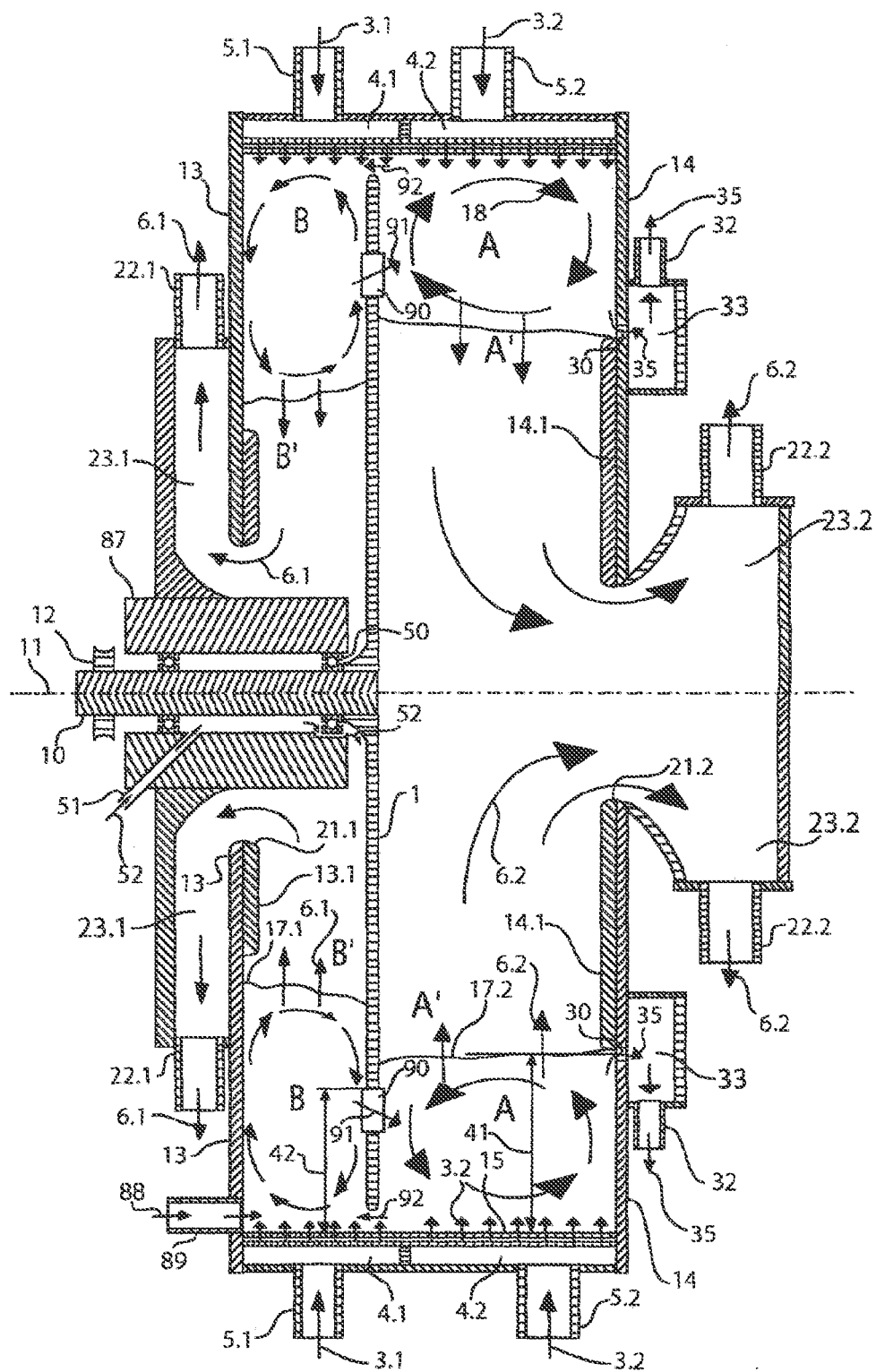
FIG. 6 shows the longitudinal section through a device similar to the device in FIG. 5, having a rotary disk comprising openings (90) for transferring solid particles from one zone to the other.

FIG. 6 is a variant of FIG. 5, where the rotary disk (1) comprises through-openings (90) located within the rotary fluidized bed when the device is in operation, in order to allow the passage of solid particles, accompanied by a little fluid, from one annular zone to the other. These through-openings are profiled, optionally with the aid of fins, so as to push or suck the solid particles (91) in the desired direction, from the zone B toward the zone A in this example, when the rotary disk rotates more quickly than the rotary fluidized bed. The solid particles (92) return from the annular zone (A) toward the zone (B) under the effect of the difference in pressure due to the accumulation of solid particles in suspension in the annular zone (A). The speed of circulation of the solid particles between the annular zones (A) and (B) is controlled by the speed of rotation of the rotary disk (1). The excess solid particles (35) are discharged through the outlet openings (30).

The free circular surface (17.1) of the rotary fluidized bed in the annular zone (B) must be closer to the central axis (11) than the openings (90) in the rotary disk, so as to allow the transfer of solid particles from the annular zone (B) toward the annular zone (A). Otherwise, this would bring about a significant transfer of liquid not accompanied by solid particles from this zone (B) to the zone (A). Since this situation is generally undesirable, it is necessary to have a device for controlling the relative pressures in the free zones in order to avoid it.

The solids (88) are fed with the aid of a tube (89) passing through the lateral side (13) in the vicinity of the circular wall.

FIG. 7 shows the longitudinal section through a device similar to the one in FIG. 5, having a second rotary disk (1.2) that is fixed to the rotary disk (1) for example by rivets (55). The disk (1.2) is located near the support (87) for the rotary disk (1.1). It has a central opening (26) which allows it to surround this fixed support (87).

One or more tubes (20), passing through the fixed support (87) which keeps the rotary disk (1) at the desired distance from the lateral side (13), feed the solid particles (2), optionally entrained by a fluid.

In this example, the fixed support (87) is profiled so as to guide the solid particles (2) along the rotary disk (1) so as to give them a speed of rotation and thus a centrifugal force sufficient to not be pushed back through the central opening (26) in the rotary disk (1.2) by the fluid (6.1) which passes through the space separating the two rotary disks. The solid particles which are entrained in a rotating movement by the two rotary disks are pushed by the centrifugal force toward the periphery of these disks. In this example, the rotary disk (1) is profiled so as to guide the solid particles toward the annular zone (B), where they form a rotary bed, fluidized by the fluid (3.1) injected through the circular wall in a direction mainly at a tangent.

In this example, there is no through-opening (90) for transferring solid particles from one zone to the other. The transfers of solid particles from the annular zone (B) toward the annular zone (A) and the exchanges of solid particles between the two annular zones take place between the periphery of the disk (1) and the circular wall (15). The width of this passage is chosen so as to allow the desired transfer of heat between these zones, if they are at different temperatures.

The rotary disk (1) could have suitably profiled teeth or fins along its outer rim, as in the example in FIG. 5, so as to push or suck the solid particles (92) in the desired direction and thus to increase and control the exchanges of solid particles between the two annular zones, and thus to control the difference in temperature between the two annular zones by controlling the speed of rotation of the rotary disk.

The central tube (20.1) which passes through the lateral side (14) by passing through the central opening (21.2) can be used, for example, for injecting or spraying a liquid (2.1) onto the surface of the disk (1) and forming a thin film (9) which flows rapidly along this surface under the effect of the centrifugal force. In this example, the rotary disk (1) has a circular projection (83) which is profiled so as to disperse this liquid in the form of fine droplets in the interior of the free central zone (A'). These droplets can have a speed of rotation greater than that of the rotary fluidized bed, thereby making it possible to maintain a free vortex in the free zone, while cooling, by their evaporation, the gas (6.2) a few milliseconds after it has passed through the rotary fluidized bed of the annular zone (A).

FIG. 8 shows the longitudinal section through a device similar to the one in FIG. 7, having a hollow rotary disk (1.3) that may be two disks attached to one another and separated by a closed space. A central tube (20.2) passing through the rotating shaft (10) makes it possible to feed a fluid (2.2) into the interior of the hollow rotary disk (1.3). The centrifugal force makes it possible to obtain a relatively high pressure at the periphery of the hollow rotary disk and to inject or spray the fluid (2.2) through orifices (89), located preferably at the periphery of the hollow rotary disk, in the desired direction, while accelerating the speed of rotation of the rotary fluidized bed. This fluid (2.2) can entrain solid particles or contain solids in solution.

In this example, a central tube (20.1) coming from the side (14) and one or more tubes (20) coming from the side (13) in the vicinity of the central axis make it possible to inject cooling liquids (2.1) onto each of the faces of the hollow rotary disk (1). Circular projections (83.1) and (83.2), which are suitably profiled and located in the free central zones (A') and (B'), make it possible to disperse the films of liquid (9) which flow along the rotary disk under the effect of the centrifugal force, in the form of microdroplets in these free central zones, when the device is in operation. The evaporation of these liquids makes it possible to dramatically cool the hot gases which have passed through the rotary fluidized bed, without slowing the speed of rotation of the free vortices formed by these gases.

In this example, the device for feeding fluids through the circular wall (15) makes it possible to feed three fluids that are different and/or at different temperatures and different pressures (3.1), (3.2) and (3.3) and these fluids have to be in the gaseous form (6.1) and (6.2) after having passed through the rotary fluidized bed in order to obtain the rapid cooling described above.

Examples in the following text show how these devices according to the invention can be used for the conversion of solid particles such as catalytic polymerization or roasting, pyrolysis and gasification of bioparticles or other solid particles that react in contact with the fluids passing through the rotary fluidized bed.

For example, the device in FIG. 1 can be used for the catalytic polymerization of ethylene. The activity of the catalytic particles is all the greater the smaller they are; the polymerization of ethylene is a very exothermic reaction and cooling by evaporation of liquid has contraindications. Rotary fluidized beds are best able to cool the very small particles with the aid of a very large flow of gas. The use of the device described in FIG. 1 makes it easier to feed optionally pre-polymerized catalytic microparticles and to pass a mass of ethylene of the same approximate size as the mass of the fluidized bed through the rotary fluidized bed each second, while keeping it stable, dense and homogeneous. This device makes it possible to use ethylene at low pressure. This ethylene is cooled outside the device and recycled. It makes it possible to control the temperature of the bed with very great precision while allowing extremely high catalytic activity and thus residence times of the catalytic particles in the interior of the circular chamber of around a minute, compared with several hours in the conventional gaseous phase processes, which have to work at relatively high pressures and use the evaporation of light hydrocarbons for cooling. The possibility of injecting different gases and/or gases at different temperatures into the interior of the separate annular zones, for example with the aid of devices similar to those described in FIGS. 5 to 8, makes it possible to produce more complex polymers. The recycling of the different gases can be carried out separately.

The roasting of biomasses is another example. It requires the provision of heat at relatively low temperatures. The use of the device in FIG. 1 makes it possible, for example, to feed small particles of ground and optionally damp biomass by extrusion or entrainment with the aid of a gas behind the rotary disk and to pass a very large quantity of hot gases that may optionally be recycled through the rotary fluidized bed containing particles of biomass. Since the transfer of heat is very efficient and very rapid in the interior of the rotary fluidized bed if the particles of biomass are very small, the temperature of this hot gas may be close to the temperature desired for roasting and thus be relatively low. This makes it possible to use air below the ignition point of the biomass rather than more expensive gases, for example water vapor.

The gasification of biomasses or other carbon-based matter requires the provision of heat at high temperatures. Devices similar to those in FIGS. 5 to 8 may be appropriate. The biomass is preferably fed between two disks (FIG. 7) at the same time as a small quantity, for example a few percent, of inert or catalytic particles, such as sand or dolomite. All of the solids are fed for example into the annular zone (B) where the endothermic gasification reaction takes place. These solid particles are fluidized by their gasification and by a flow of gas, preferably non-oxidizing gas, for example water vapor. The carbon-containing residues and the inert solid particles which accumulate in the annular zone (B) are progressively transferred toward the annular zone (A), through which a flow of gas containing oxygen, for example air, passes. The combustion of at least a part of the residual carbon produces the heat necessary for the gasification. The heat is transferred toward the annular zone (B) by virtue of the exchanges of solid particles between the two annular zones. The inert particles which accumulate in the rotary fluidized bed increase the number of these exchanges of solid particles and thus of heat. The excess solids are discharged through the outlets (30).

Simulations have shown that a temperature of around 700° C. in the combustion zone and of around 600° C. in the gasification zone can allow intensification of the gasification by a factor of more than ten compared with conventional processes. This device makes it possible to separate the combustion gases from the gasification gases. Furthermore, the very rapid gasification at relatively high temperatures makes it possible to increase the proportion of gas produced and the very rapid cooling thereof makes it possible to reduce undesirable secondary reactions.

These devices according to the invention can also be used for the conversion of fluids that pass through the rotary fluidized bed and react in contact with the solid particles in suspension in the rotary fluidized bed using this device. Said solid particles may be, at least in part, catalysts that encourage said conversion, for example the catalytic or thermal cracking of hydrocarbons.

The hydrocarbons are fed, for example into the annular zone (B) where the endothermic catalytic or thermal cracking reaction takes place, through the circular wall or between two rotary disks or into the interior of a hollow rotary disk, in a gaseous or liquid form. The annular zone (A) is passed through by gases which produce an exothermic reaction therein, for example the combustion of residual carbon deposited on the solid particles or the combustion of a gas mixture, for example of hydrogen and oxygen, which are injected through the circular wall into the annular zone (A). The heat produced is transferred into the annular zone (B) by the exchange of the solid particles between the two zones. These exchanges of solid particles make it possible to keep the rotary fluidized bed in the annular zone (B) at the desired cracking temperature.

If the solid particles are catalysts, the combustion of the carbon deposited on these particles during the catalytic cracking of the hydrocarbons in the annular zone (A) allows the regeneration of the catalyst.

These processes require very short reaction times, followed by very rapid cooling, in order to avoid the secondary reactions which are generally undesirable. The fact that the residence time of the fluids in the rotary fluidized bed is of the order of milliseconds and the possibility of spraying into the free central zone, with the aid of the rotary disk, microdroplets of a liquid for cooling the gases a few milliseconds after having passed through the rotary fluidized bed, is particularly favorable to these processes. These extremely short residence times make it possible to work at temperatures of the rotary fluidized bed and thus speeds of reaction that are significantly higher than the temperatures used in conventional devices.

These high temperatures and speeds of reaction generate a large amount of residual carbon, which is deposited on the catalytic particles. In order to maintain their catalytic activity, it is necessary to regenerate them very rapidly. The device according to the invention allows a very rapid exchange of solid particles between the two annular zones, of around a second. This device thus allows higher speeds of reaction and thus an intensification of these processes by sometimes several orders of magnitude.

The invention claimed is:

1. A device for obtaining a rotary fluidized bed within a fixed circular chamber delimited by a circular wall (15) and fixed lateral walls (13) and (14), comprising:
   a device (3) for injecting gaseous or liquid fluids via numerous injection openings (16) through said circular wall (15) in directions mainly at a tangent to said circular wall (15);
   a device (6) for centrally discharging fluids which have passed through the rotary fluidized bed through at least one central outlet opening (21.1) or (21.2) disposed around or in the vicinity of the central axis (11) of said circular chamber;
   a device for feeding solid particles into the interior of said circular chamber;
   a device for discharging solid particles from the circular chamber, comprising at least one outlet opening (30) located at a distance (31) from said circular wall that corresponds to the desired thickness of the rotary fluidized bed;
characterized in that it comprises:
   at least one rotary disk (1) the rotation axis of which is along or in the vicinity of the central axis (11) of said circular chamber and the outer rim (61) of which is at a distance (41) from said circular wall (15) that is less than the desired thickness (31) of said rotary fluidized bed when the device is in operation, and a device (12) for rotating said rotary disk (1) in the same direction as and more quickly than said rotary fluidized bed.

2. The device according to claim 1, characterized in that the square of the ratio between the surface area of the circular wall (15) and the sum of the surface areas of said injection openings (16) is greater than 200 times the ratio between the mean diameter of the circular chamber, D, and the mean diameter of the solid particles, d, multiplied by the ratio between the mean density of the fluid, $\rho f$, and the mean density of the solids, $\rho s$.

3. The device according to claim 1, characterized in that the mean distance (96) between said injection openings (16) is less than one twentieth of the mean diameter, D, of said circular chamber, and in that the hourly mass flow rate of the fluids passing through the rotary fluidized bed is greater than 200 times the mass of said rotary fluidized bed when the device is in operation.

4. The device according to claim 1, characterized in that it comprises at least one tube (20) for feeding solids, optionally entrained by a fluid or in solution in a fluid (2), in the vicinity of the central axis (11), against the rotary disk (1).

5. The device according to claim 4, characterized in that the annular space (62) between the outer rim (61) of said rotary disk (1) and the circular wall (15) is passed through by gases (3.1) that are injected through said circular wall (15), and in that said tube (20) makes it possible to inject or spray onto the surface of said rotary disk (1) a liquid containing solids in solution, and in that the edge (60) of said surface at said outer rim (61) forms an acute and sharp angle.

6. The device according to claim 1, characterized in that the outer rim (61) of the rotary disk or at least a part (63) of the surface of said rotary disk, which is in contact with the rotary fluidized bed when the device is in operation, comprises teeth (70) or protuberances or fins (64) which increase the friction between the rotary disk and the fluidized bed.

7. The device according to claim 6, characterized in that said teeth (70) or protuberances or fins (64) and/or said part (63) of the surface of the rotary disk are profiled so as to push the solid particles in the desired longitudinal direction when the rotary disk rotates more quickly than the rotary fluidized bed.

8. The device according to claim 1, characterized in that it comprises a central tube (20.1), or a tube (20) in the vicinity of the central axis, for injecting or spraying a liquid (2.1) onto the surface of said rotary disk, and in that said rotary disk comprises at least one circular protrusion (83) which is located on said surface of said rotary disk, in the free central zone, and which is profiled so as to disperse microdroplets of said liquid under the effect of the centrifugal force, in said free central zone, when said device is in operation.

9. The device according to claim 1, characterized in that said rotary disk (1) is fixed to at least one second disk (1.2), delimiting an annular space between the two rotary disks, and in that said second disk (1.2) comprises a central opening (26) for centrally discharging fluids (6.1) that pass through said annular space and for centrally feeding liquids (2.1) or solids (2) optionally entrained by a fluid or in solution in a liquid, with the aid of a tube (20.1) or (20) along or in the vicinity of the central axis (11).

10. The device according to claim 1, characterized in that the central discharge of the fluids (6) which have passed through the rotary fluidized bed takes place through one of said lateral sides (14) and said rotary disk (1) is located in the vicinity of the opposite side (13).

11. The device according to claim 1, characterized in that the central discharge of the fluids which have passed through the rotary fluidized bed takes place through the two lateral sides (13) and (14), and in that said rotary disk (1) divides said circular chamber into two circular zones.

12. The device according to claim 11, characterized in that said rotary disk (1) comprises openings (90) located at a distance (42) from the circular wall (15), that is less than the desired thickness (31) of said rotary fluidized bed when said device is in operation, and in that said openings (90) are profiled so as to encourage the transfer of solid particles from one annular zone to the other, in the desired direction, when said rotary disk rotates more quickly than said rotary fluidized bed.

13. The device according to claim 1, characterized in that it comprises a hollow rotary disk (1.3) and a central tube (20.2), passing through the rotary shaft (10) to which said hollow rotary disk is fixed, for feeding a fluid (2.2) that can entrain solid particles or contain solids in solution or suspension into the interior of said hollow rotary disk, and in that said hollow rotary disk (1.3) comprises orifices (89) along its periphery for injecting or spraying said fluid (2.2) in the desired direction into the interior of said rotary fluidized bed when said device is in operation.

14. A process for the catalytic polymerization, drying, extraction of volatiles from, coating, impregnation, roasting, pyrolysis, gasification, solidification or other conversion of solid or liquid particles in suspension in a rotary fluidized bed or for the catalytic or thermal conversion of fluids passing through said rotary fluidized bed using a device according to claim 1, characterized in that said solid or liquid particles or said fluids undergo conversion by coming into contact with one another within the rotary fluidized bed produced by this device.

15. The process for the conversion of at least two different fluids and/or of solids according to claim 14, characterized in that an exothermic reaction takes place in an annular zone of said rotary fluidized bed, and an endothermic reaction takes place in another annular zone of said rotary fluidized bed, said zones being passed through by said fluids and being separated from one another by at least one rotary disk of this device.

16. The process for the conversion of at least two different fluids according to claim 15, characterized in that at least some of said solid particles are catalysts for one of said conversions of one of said fluids in an annular zone and that they are regenerated by the other said fluid in another annular zone.

17. The process for the solidification of microdroplets according to claim 14, characterized in that the microdroplets are obtained by the centrifugal dispersion of a film of liquid injected or sprayed onto a rotary disk of this device, and in that the solidification is obtained by the evaporation of said liquid containing solids in solution or by chemical or thermal reaction in contact with gases passing through the rotary fluidized bed in the vicinity of said rotary disk.

18. The process according to claim 14, characterized in that it comprises the step which consists in recycling at least one of said fluids.

* * * * *